United States Patent [19]

Fujiyama

[11] Patent Number: 5,754,344
[45] Date of Patent: May 19, 1998

[54] HEAD-MOUNTED STEREOSCOPIC IMAGE DISPLAY APPARATUS

[75] Inventor: Yasutomo Fujiyama, Atsugi, Japan

[73] Assignee: Canon Kabushiki Kaisha, Tokyo, Japan

[21] Appl. No.: 727,916

[22] Filed: Oct. 9, 1996

[30] Foreign Application Priority Data

Oct. 12, 1995 [JP] Japan .................. 7-290387

[51] Int. Cl.⁶ .................................................. G02B 27/10
[52] U.S. Cl. ........................ 359/631; 359/463; 359/619
[58] Field of Search ......................... 359/463, 472, 359/626, 619, 620, 630, 631

[56] References Cited

U.S. PATENT DOCUMENTS

| | | |
|---|---|---|
| 2,889,739 | 6/1959 | Moore . |
| 3,365,350 | 1/1968 | Cahn . |
| 3,439,972 | 4/1969 | Ratliff, Jr. . |
| 3,572,893 | 3/1971 | Bennett et al. ........................ 350/130 |
| 4,346,962 | 8/1982 | Holmes, Jr. ........................ 350/128 |
| 4,422,720 | 12/1983 | Sheiman et al. ........................ 350/138 |
| 5,006,072 | 4/1991 | Letovsky et al. ........................ 359/61 |
| 5,184,250 | 2/1993 | Lacroix ........................ 359/631 |
| 5,202,793 | 4/1993 | Auge ........................ 359/463 |
| 5,464,175 | 11/1995 | Woodgate et al. ........................ 359/463 |
| 5,581,402 | 12/1996 | Taylor ........................ 359/463 |

*Primary Examiner*—Georgia Y. Epps
*Assistant Examiner*—Thomas Robbins
*Attorney, Agent, or Firm*—Morgan & Finnegan, LLP

[57] ABSTRACT

This invention relates to a head-mounted stereoscopic image display apparatus to be mounted on the head portion of an observer, including display means for displaying a stripe image formed by dividing right and left parallax images that constitute a stereoscopic image into stripe pixels, and alternately arranging the right and left stripe pixels in a predetermined order, an image separation optical system disposed in front of the display means and adapted to separate light beams outgoing from the right and left stripe pixels, and a concave mirror adapted to reflect the light beams from the image separation optical system so as to allow the observer to observe virtual images of the parallax images.

12 Claims, 5 Drawing Sheets

HEAD-MOUNTED STEREOSCOPIC IMAGE DISPLAY APPARATUS

BACKGROUND OF THE INVENTION

1. Field of the Invention

The present invention relates to a head-mounted stereoscopic image display apparatus and, more particularly, to a stereoscopic image display apparatus which concurrently displays parallax images for the right and left eyes on a single display element, so that the right and left eyes of an observer can observe a stereoscopic image by separating the parallax images.

2. Related Background Art

In recent years, since the establishment of high-resolution, full-color moving image two-dimensional display technique represented by a high-vision TV, our concern in the image display field is turning to the development of stereoscopic dynamic image display apparatuses. Hence, stereoscopic image display apparatuses of various types have been proposed.

Of these apparatuses, a stereoscopic image display apparatus that utilizes the binocular parallax effect has been most extensively studied.

A stereoscopic image display method based on the binocular parallax effect is roughly classified into a head-mounted two-panel screen display method in which two display elements are disposed in front of the right and left eyes to display parallax images corresponding to the right and left eyes, a spectacle method in which a stereoscopic image is visually observed using polarization spectacles or a time-division shutter, and a display surface method in which an observer observes a stereoscopic image by viewing parallax images displayed on a single display means with the naked eye, i.e., without using any spectacles.

Although the two-panel screen display method has a limitation on the number of observers, i.e., is designed for a personal use since two, right and left images which are already separated are displayed, an image with a wide angle of field can be easily presented using even compact display panels. Hence, this method is particularly receiving a lot of attention with the advent of compact, high-resolution displays such as compact CRTs (cathode ray tubes), AM-LCDs (active matrix liquid crystal display devices), and the like.

The spectacle method has a feature that a plurality of users can observe a stereoscopic image, i.e., the degree of freedom of the observation view range is high.

The display surface method is characterized in that a stereoscopic image can be displayed by a simple system arrangement since it optically separates right and left images without using any polarization spectacles or the like.

The display surface method includes a lenticular lens method and a parallax barrier method. These methods will be explained below.

Figure 4:
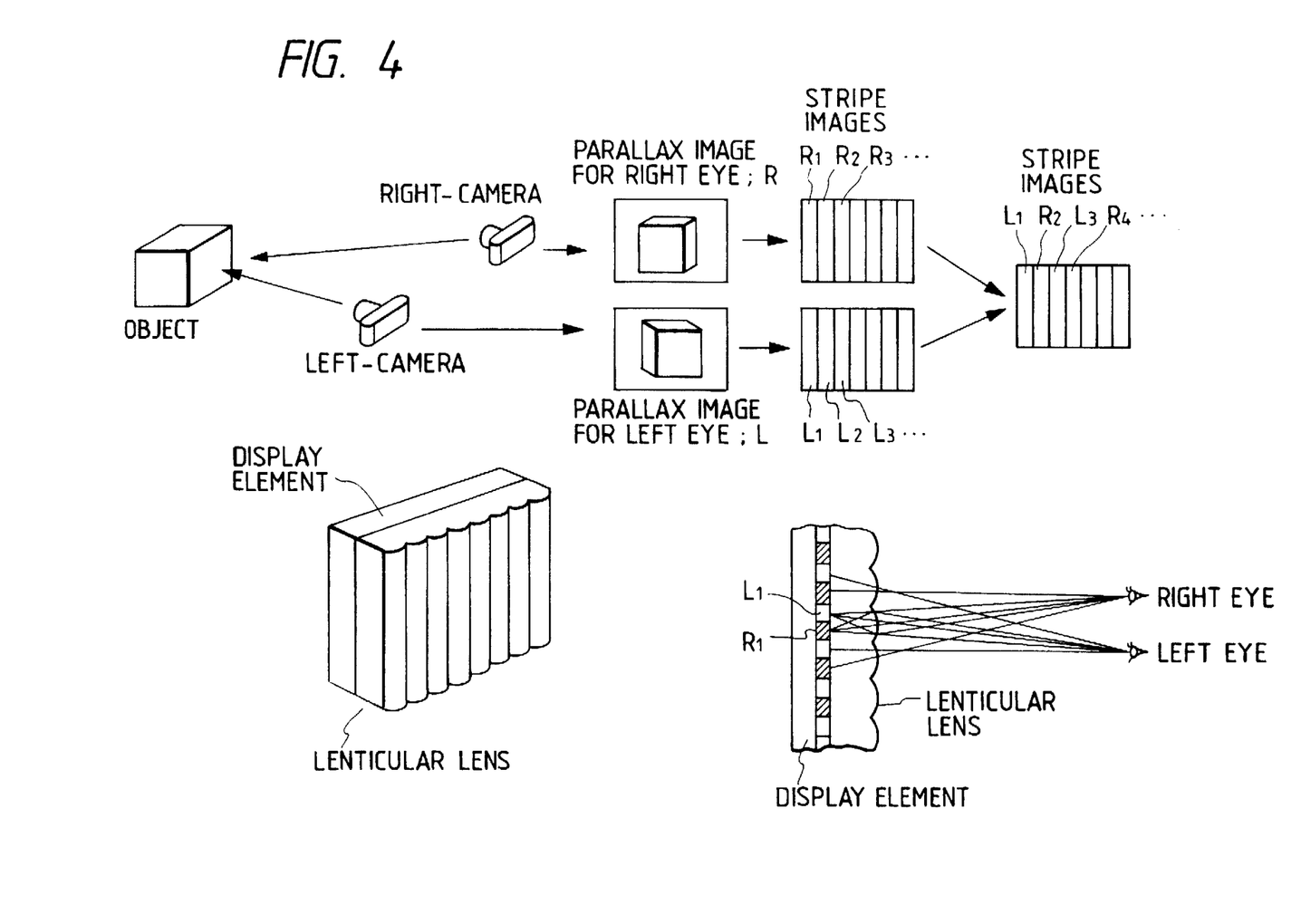
FIG. 4 is an explanatory view of a stereoscopic image display operation based on a conventional lenticular lens method.
Figure 5:
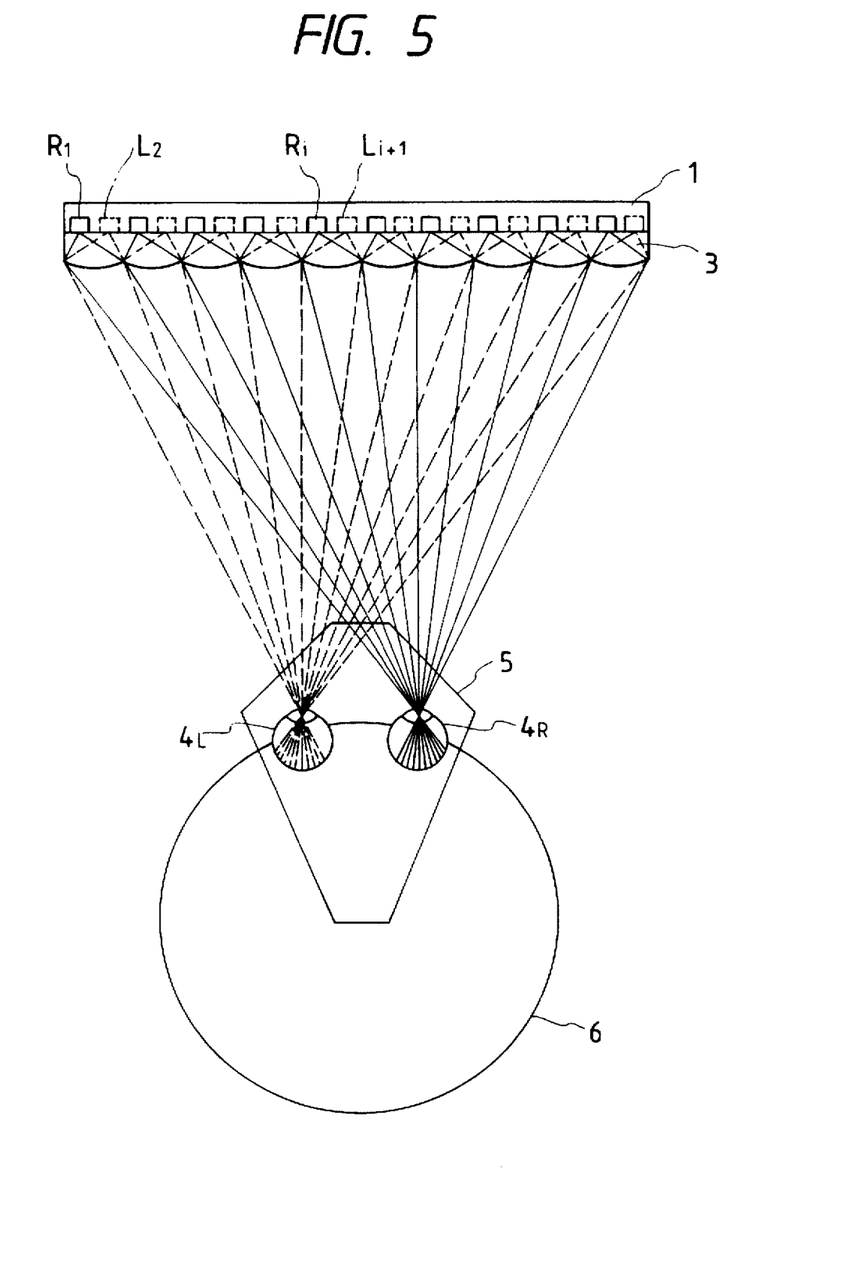
FIG. 5 is a schematic view showing a stereoscopic image display apparatus based on a conventional display surface method using a lenticular lens.

The lenticular lens method is as follows. That is, as shown in FIG. 4, an image of an object is picked up by right- and left-cameras to obtain parallax images R and L for the right and left eyes, and the parallax images are then divided into stripe pixels $L_1, L_2, L_3, \ldots$, and $R_1, R_2, R_3, \ldots$. A single stripe image is formed by alternately arranging the right and left stripe pixels $R_i$ and $L_i$ in the order of, e.g., $L_1, R_2, L_3, R_4, \ldots$, and is displayed on a display element. As shown in FIG. 5, light beams from the right and left stripe pixels $R_{i+1}$ and $L_i$ displayed on a display element 1 are separated by a lenticular lens 3 to have directivities in correspondence with the right and left eyes $4_R$ and $4_L$, and the separated light beams are guided to the two eyes of an observer, so that the right and left eyes observe the corresponding parallax images R and L. In this manner, the observer can view a stereoscopic image.

FIG. 6 is an explanatory view of a stereoscopic image display operation based on the parallax barrier method. In this method, a slit-shaped barrier (parallax barrier) is disposed in front of an image display means, and separates a stripe image into right and left parallax images. The right and left lines of sight recognize these parallax images R and L via the barrier, so that the observer can observe a stereoscopic image.

The separation angle of the right and left image in the display surface method is determined by the interval between adjacent right and left pixels on the display element 1 and the curvature of the lenticular lens 3 in the lenticular lens method, or by the slit interval and the aperture width in the parallax barrier method.

In recent years, upon development of the photolithography technique, ion injection technique, and glass mold working technique, a microlens can be worked in angular dimensions of several ten microns that are substantially equivalent to display pixels, and even a stereoscopic image display apparatus based on the display surface method can realize a high-resolution display operation using a compact display element.

Since the two-panel screen display method uses two display devices, if it is assumed that an apparatus adopting this method is mounted on the head portion of an observer, its practical use is hampered in terms of its poor feeling upon wearing and poor portability caused by a weight load, an increase in consumption power of, e.g., a backlight, and the like.

Since the spectacle method must present right and left images on a single display screen at a speed at which these images do not mix with each other, it poses problems such as generation of flicker, a decrease in luminance of images to be presented as compared to other methods, and the like.

Since the display surface method concurrently displays right and left parallax images on a single display surface, the number of pixels must be doubled to realize a resolution as high as that in other stereoscopic image display methods, and an observation view range (rope) 5 is limited due to strong directivity of an optical system, as shown in FIG. 5. Unless a head portion 6 of an observer is fixed in position within the observation view range 5, the right and left parallax images R and L mix with each other, thus disturbing stereoscopic viewing.

In addition, in order to display an image with a wide angle of field, a large-screen display means or projection screen is required. If a small-screen display element is used, the observation space is limited.

More specifically, when the observer directly observes a display based on the display surface method, it is desired to give a field angle as wide as about 100° so as to cover an observation range having a wide angle of field defined by the angles of guide fields of view of the right and left eyes and the interval between the right and left pupils, and to present a real image space. However, in order to assure such wide field angle, a large-screen display is required. For this reason, it is not practical to mount such apparatus on the head portion for observation in terms of a problem such as the weight of the display.

When a compact display element is to be directly observed, the width of each stripe image decreases, and hence, the pitch of the lenticular lens decreases accordingly.

As a result, it becomes difficult to cover the observation range with a wide angle of field for the right and left eyes by only the curvature of the lenticular lens. Therefore, in this structure, the observation view range becomes extremely narrow, and it becomes difficult for a person with a normal pupil interval to directly stereoscopically observe the entire screen.

As is well known, when the display screen is formed into a concave surface with respect to the observer, a stereoscopic feeling can be easily generated. However, it is difficult for the existing techniques to manufacture the display surface of a display into a concave surface shape.

Furthermore, in order to cope with a plurality of observers, i.e., a plurality of observation view ranges, the number of pixels corresponding to the number of observers or observation view ranges must be assured so as to maintain a resolution as high as that for only one observer.

SUMMARY OF THE INVENTION

It is the first object of the present invention to provide a head-mounted stereoscopic image display apparatus which has a simple, lightweight structure, and can reduce the consumption power.

It is the second object of the present invention to provide a novel stereoscopic image display apparatus that allows an observer to stably observe a stereoscopic image since it can easily fix in position the observation view range of the observer, which is a problem in the conventional display surface method, by mounting a stereoscopic image display apparatus based on the display screen method on the head portion of the observer.

In order to achieve the above objects, a head-mounted stereoscopic image display apparatus according to an aspect of the present invention, comprises:

- display means for displaying a stripe image formed by dividing right and left parallax images that constitute a stereoscopic image into stripe pixels, and alternately arranging the right and left stripe pixels in a predetermined order;
- an image separation optical system disposed in front of the display means and adapted to separate light beams outgoing from the right and left stripe pixels; and
- a concave mirror adapted to reflect the light beams from the image separation optical system so as to allow the observer to observe virtual images of the parallax images.

The image separation optical system comprises a lenticular lens or a parallax barrier corresponding to the right and left stripe pixels.

The image separation optical system comprises a toric lens on the light beam outgoing side.

The apparatus further comprises two mirrors adapted to reflect the light beams from the image separation optical system to guide the light beams toward the concave mirror and disposed in a V shape, and angle adjustment means for adjusting directions of the two light beams to be reflected by the two mirrors.

The mirrors comprise plane mirrors or concave mirrors.

The image separation optical system is disposed outside observation optical paths of the virtual images.

The concave mirror comprises a total reflection mirror.

The concave mirror comprises a semitransparent mirror.

A region, crossing observation optical paths of the virtual images, of the concave mirror comprises a total reflection mirror, and the remaining region comprises a semitransparent mirror or a transparent mirror.

A head-mounted stereoscopic image display apparatus according to another aspect of the present invention, comprises:

- display means for displaying a stripe image formed by dividing right and left parallax images that constitute a stereoscopic image into stripe pixels, and alternately arranging the right and left stripe pixels in a predetermined order;
- an image separation optical system disposed in front of the display means and adapted to separate light beams outgoing from the right and left stripe pixels; and
- a first reflection member adapted to reflect the light beams from the image separation optical system so as to allow the observer to observe virtual images of the parallax images.

The image separation optical system comprises a lenticular lens or a parallax barrier corresponding to the right and left stripe pixels.

The image separation optical system comprises a toric lens on the light beam outgoing side.

The apparatus further comprises a second reflection member having two mirrors adapted to reflect the light beams from the image separation optical system to guide the light beams toward the first reflection member and disposed in a V shape, and angle adjustment means for adjusting directions of the two light beams to be reflected by the two mirrors of the second reflection member.

The first reflection member comprises a plane mirror, and the second reflection member comprises concave mirrors.

The first reflection member comprises a concave mirror, and the second reflection member comprises plane or concave mirrors.

The detailed embodiments of the present invention will become apparent from the following description of some embodiments.

BRIEF DESCRIPTION OF THE DRAWINGS

FIG. 6 is an explanatory view of a stereoscopic image display operation based on a conventional parallax barrier method.

DETAILED DESCRIPTION OF THE PREFERRED EMBODIMENTS

In a head-mounted stereoscopic image display apparatus of the present invention, a single stripe image is displayed on the display surface of a single display element (single panel) as in the conventional display surface method. The stripe image is formed in such a manner that parallax images R and L for the right and left eyes are respectively divided into right stripe pixels $R_1, R_2, R_3, \ldots$, and left stripe pixels $L_1, L_2, L_3, \ldots$, and these stripe pixels are alternately arranged in a predetermined order of, e.g., $L_1, R_2, L_3, R_4, \ldots$. Then, transmitting light beams that outgo from the right and left stripe pixels $R_{i+1}$ and $L_i$ are optically separated at a predetermined angle by an image separation optical system such as a lenticular lens.

In the display surface method, the light beam separation angle of the image separation optical system is designed to be large enough to cover the fields of view of the right and left eyeballs.

Light beams from the right and left stripe pixels, which outgoes from the image separation optical system, (i.e., light beams from the right and left parallax images) are reflected by a concave mirror (first reflection member) that covers the guide fields of view of the right and left eyes, and respectively form virtual images in front of the observer. In this case, light beams from the left stripe pixels form a virtual image L' of the parallax image L for the left eye, and light beams from the right stripe pixels form a virtual image R' of the parallax image R for the right eye, which image has the same position and size as those of the virtual image L'. The observer views the virtual images R' and L' with his or her right and left eyes, thus observing a stereoscopic image.

Figure 1A:
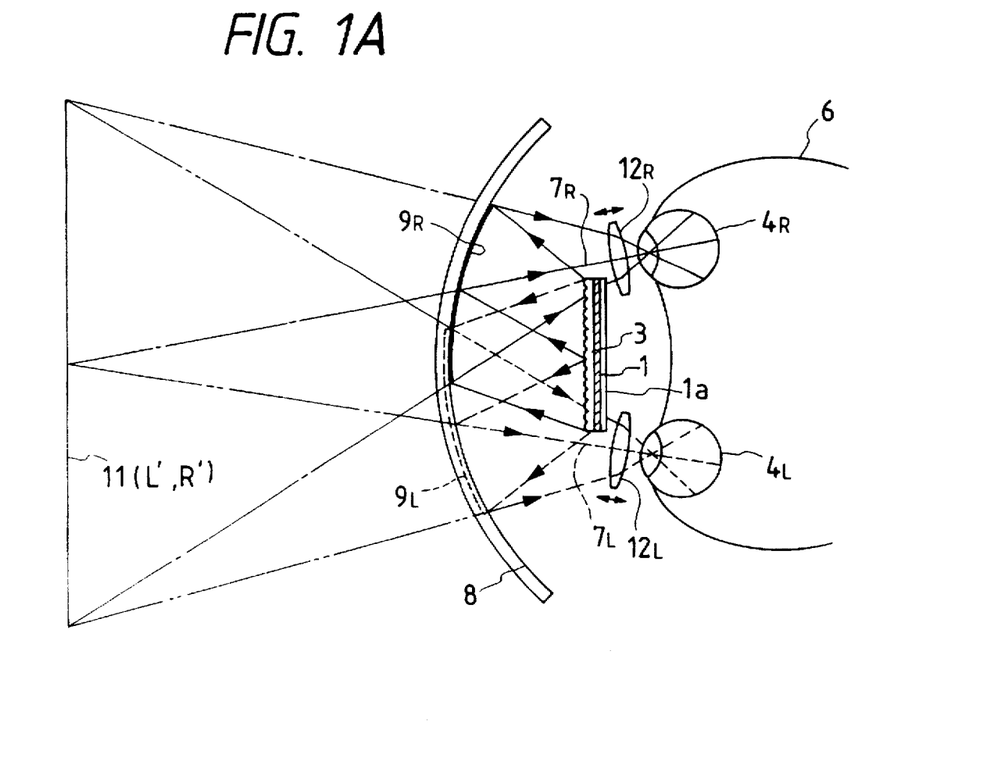
FIGS. 1A and 1B are schematic views showing principal part of the first embodiment of the present invention.
Figure 1B:
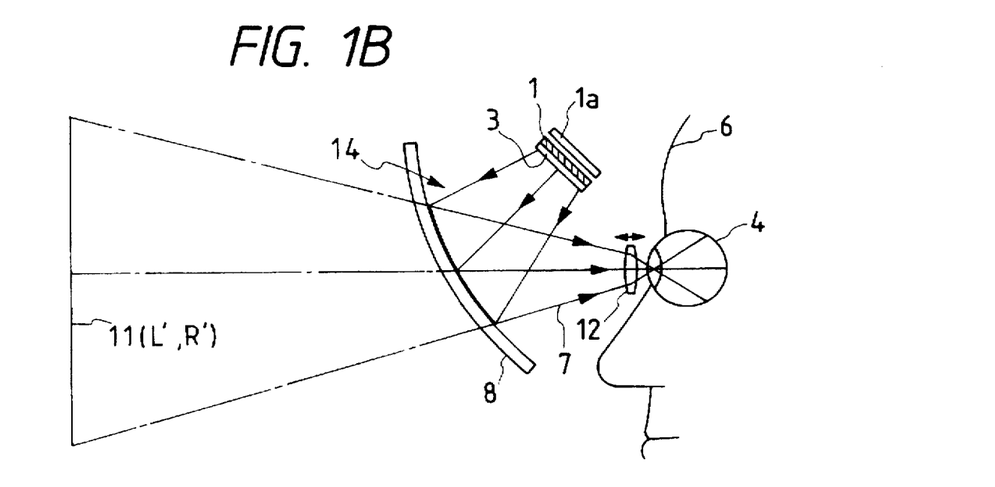

FIGS. 1A and 1B are schematic views showing principal part of the first embodiment of the present invention. FIG. 1A is a horizontally projected sectional view, and FIG. 1B is a vertically projected sectional view. Note that the respective projected sectional views show the section along a light ray that emerges from the center of a display element 1 and reaches the center of the eye of an observer. In FIGS. 1A and 1B, a display element 1 comprises a polycrystalline silicon transmission type AM-LCD, and its display surface has a diagonal dimension of 3" and consists of one million pixels. On the display surface, one stripe image is displayed. The stripe image is formed in such a manner that parallax images R and L that constitute a stereoscopic image are respectively divided into right stripe pixels $R_1$, $R_2$, $R_3$, . . . and left stripe pixels $L_1$, $L_2$, $L_3$, and these stripe pixels are alternately arranged in the predetermined order of, e.g., $L_1$, $R_2$, $L_3$, $R_4$, . . . , as shown in FIG. 4. Therefore, each of the parallax images R and L for the right and left eyes is displayed using half a million pixels. An illumination light source 1a illuminates the entire surface of the display element 1 from the rear surface side. A lenticular lens plate 3 serves as an image separation optical system.

A concave mirror 8 has a predetermined curvature and serves as a first reflection member. A mirror surface is formed on the concave surface of the mirror 8, and forms a virtual image 11 at a predetermined position in front of the observer by reflecting light beams from the image displayed on the display element 1. Convex lenses $12_R$ and $12_L$ adjust the diopters of the virtual image 11.

Also, in FIGS. 1A and 1B, 6 represents the head portion of the observer, and $4_R$ and $4_L$ represent his or her right and left eyes. As shown in FIGS. 1A and 1B, the stereoscopic image display apparatus of this embodiment is mounted on the head portion 6 of the observer via a mounting means (not shown) to constitute an HMD (Head Mounted Display).

The operation of this embodiment will be explained below. On the display element 1, one stripe image is displayed. The stripe image is formed by respectively dividing parallax images R and L that constitute a stereoscopic image into right stripe pixels $R_1$, $R_2$, $R_3$, . . . and left stripe pixels $L_1$, $L_2$, $L_3$, . . . , and alternately arranging these stripe pixels in the predetermined order of, e.g., $L_1$, $R_2$, $L_3$, $R_4$, . . .

Illumination light emitted by the illumination light source 1a is transmitted through the stripe image on the display element 1, and is separated into light beams $7_R$ and $7_L$ from right and left stripe pixels $R_{i+1}$ and $L_i$ since it is refracted by and transmitted through the lenticular lens 3, which is disposed on the display element 1 in correspondence with right and left stripe pixels $L_i$ and $R_i$.

The light beams from the right and left stripe pixels are projected onto and reflected by the concave mirror 8, and form a virtual image 11 of the stripe image displayed on the display element 1 at a far position in front of the observer. Since the light beams from the right and left stripe pixels on the display element 1 have different exit directions from the lenticular lens 3, they respectively form virtual images R' and L' at the same position to have the same size. The virtual images R' and L' can be observed by the right and left eyes $4_R$ and $4_L$ completely separate from each other, and the observer recognizes a stereoscopic image by synthesizing the virtual images R' and L' of the parallax images in his or her retinas and brain.

Note that the convex lenses $12_R$ and $12_L$ in front of the right and left eyes $4_R$ and $4_L$ are disposed as needed.

As shown in FIG. 1B, the display element 1 is disposed at a position in front of the forehead of the head portion 6 with its display surface facing obliquely downward to point in the direction of the concave mirror 8, so as not to disturb the observation optical paths of the virtual images of the right and left eyes $4_R$ and $4_L$. The display element 1 projects right and left separated light beams 7 toward the concave mirror 8.

The curvature of the lenticular lens 3 is set, so that separated light beams from the right and left stripe pixels $R_{i+1}$ and $L_i$ are projected onto the concave mirror 8 at an angle that can cover the fields of view of the right and left eyes. On the other hand, the curvature of the concave mirror 8 is designed, so that the focal points of the right and left eyes are formed on the display surface of the display element 1 via the lenticular lens 3.

In this embodiment, since the observer observes virtual images obtained by enlarging an image displayed on the display element 1 via the concave mirror 8, the depth of the image can be increased, and the reality of the stereoscopic image can be improved.

The first embodiment constitutes a stereoscopic image display apparatus completely shielded from the exterior since the concave mirror 8 comprises a total reflection mirror. On the other hand, when the concave mirror 8 comprises a semitransparent mirror, virtual images of stereoscopic character images may be synthesized with the exterior transmitted through the semitransparent mirror. In this case, if the concave mirror comprises a liquid crystal transmission mirror, the reflection region can be arbitrarily set.

When a region on the concave mirror 8 that crosses the observation optical paths of the virtual images R' and L' uses a total reflection mirror and the remaining region uses a filter using a liquid crystal element or an electrochromy that can arbitrarily set its transmittance or reflectance, externa light 14 can pass through the region, so as to synthesize the stereoscopic image display screen with the exterior.

Figure 2A:
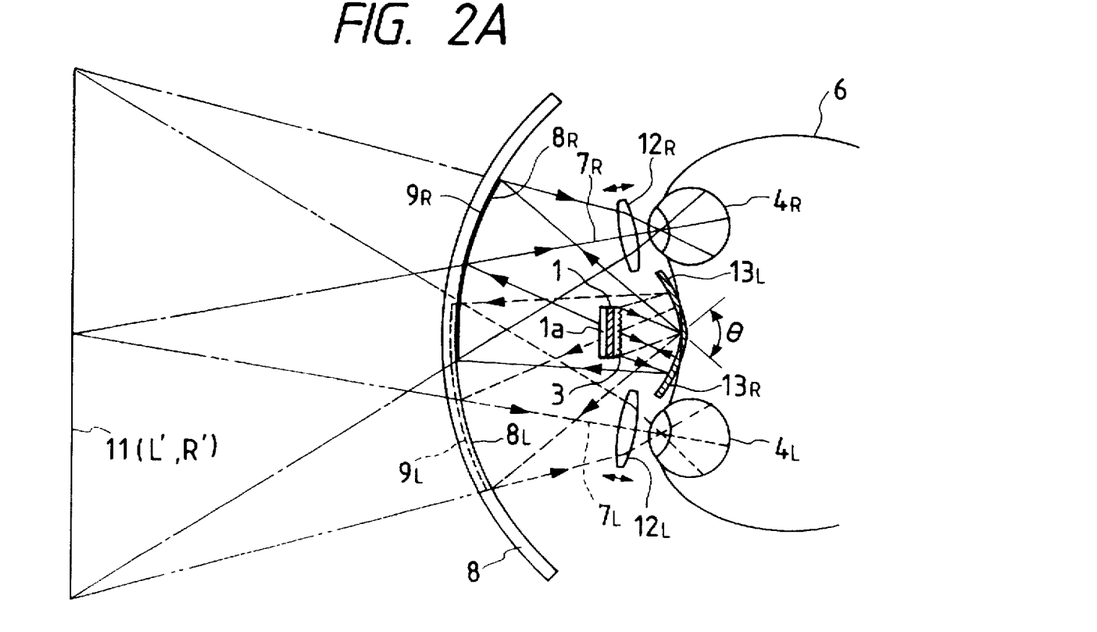
FIGS. 2A and 2B are schematic views showing principal part of the second embodiment of the present invention.
Figure 2B:
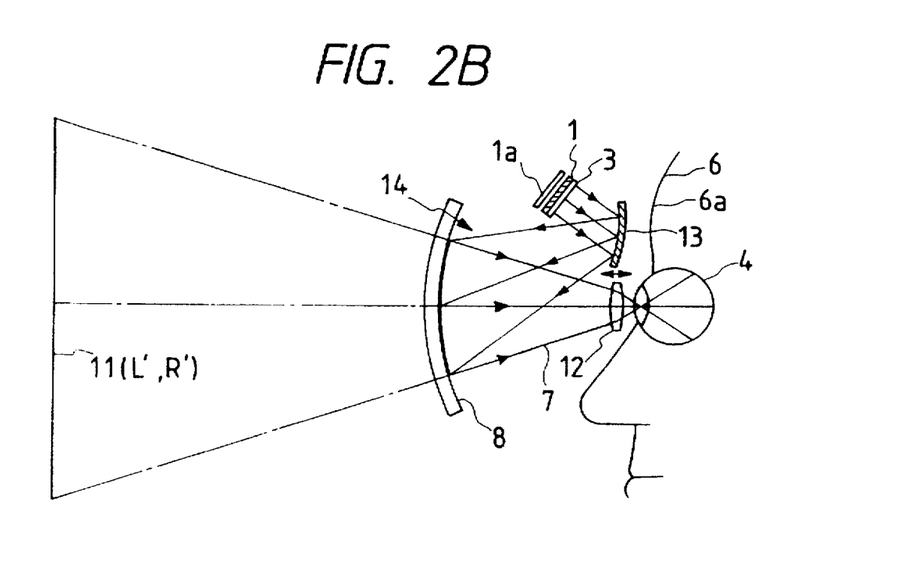

FIGS. 2A and 2B are schematic views showing principal part of the second embodiment of the present invention. FIG. 2A is a horizontally projected sectional view, and FIG. 2B is a vertically projected sectional view.

In the present invention, when a display element smaller than that in the first embodiment is used, the separation angle of the light beams from the right and left stripe pixels $R_{i+1}$ and $L_i$ must be increased to increase the enlargement factor. In this case, the interval between adjacent right and left stripe pixel must be increased, resulting in a decrease in pixel density.

On the other hand, in order to assure an appropriate pixel interval, a lenticular lens with a small radius of curvature is required.

In view of this problem, when a display element smaller than that in the first embodiment is used, the separation angle is adjusted by inserting a compact V-shaped concave mirror (second reflection member) between the display element and the concave mirror (first reflection member), and thereafter, images are enlarged by the concave mirror 8. In this manner, two parallax images R and L can be enlarged and separated without changing the separation angle of light beams from the right and left stripe pixels $R_i$ and $L_i$ on the display element.

This embodiment has the same basic function as that in the first embodiment although the dimensions of the display means and the layout of the mirror optical system are different from those in the first embodiment. In FIGS. 2A and 2B, a display element 1 (display means) comprises a monocrystalline silicon transmission type AM-LCD, and its display surface has a diagonal dimension of 1.4" and consists of half a million pixels. On the display surface, a stripe image is displayed as in the first embodiment.

The display element 1 of this embodiment is disposed in front of the forehead of a head portion 6 to face obliquely downward, so that its display surface opposes the head portion 6. Two concave mirrors (second reflection members) $13_R$ and $13_L$ are disposed at positions corresponding to light beams from the right and left stripe pixels on the display element 1 separated by the lenticular lens 3.

Each of the concave mirrors $13_R$ and $13_L$ has dimensions of 10×10 mm. The two concave mirrors are arranged to define a V shape at a crossing angle θ, and are disposed at positions above and in the vicinities of a brow 6a of the head portion so as not to shield the observation optical paths of virtual image and to project light beams reflected by these mirrors onto the concave mirror 8, as shown in FIG. 2B. Note that the crossing angle θ between the two concave mirrors can be changed by an angle adjustment means (not shown), thereby controlling the directions of two light beams reflected by the two mirrors. The concave mirror 8 is constituted not by a single concave mirror but two, right and left separated concave mirrors $8_R$ and $8_L$.

The operation of this embodiment will be explained below. On the display element 1, one stripe image is displayed. The stripe image is formed by respectively dividing parallax images R and L that constitute a stereoscopic image into right stripe pixels $R_1$, $R_2$, $R_3$, .... and left stripe pixels $L_1$, $L_2$, $L_3$, ..... and alternately arranging these stripe pixels in a predetermined order of, e.g., $R_1$, $L_2$, $R_3$, $L_4$, .... opposite to that in the first embodiment.

Illumination light emitted by the illumination light source 1a is transmitted through the stripe image on the display element 1, and is separated into light beams $7_R$ and $7_L$ from right and left stripe pixels $R_i$ and $L_{i+1}$ since it is refracted by and transmitted through the lenticular lens 3, which is disposed on the display element 1 in correspondence with right and left stripe pixels $R_i$ and $L_i$.

The separated light beams respectively travel toward the concave mirrors $13_R$ and $13_L$, and light beams reflected by these mirrors are projected onto the concave mirrors $8_R$ and $8_L$ disposed at positions opposing the eyes. Thereafter, these light beams are transmitted through the convex lenses $12_R$ and $12_L$ for diopter adjustment, and form a virtual image 11 of the stripe image displayed on the display element 1 in front of the observer. Since the light beams from the right and left stripe pixels on the display element 1 have different directions upon leaving the lenticular lens 3, they form virtual images R' and L' at the same position to have the same size. The virtual images R' and L' can be completely separately observed by the right and left eyes $4_R$ and $4_L$, and the observer recognizes a stereoscopic image by synthesizing the virtual images R' and L' of the parallax images in his or her retinas and brain.

The diopter adjustment for the right and left eyes is attained by moving the convex lenses $12_R$ and $12_L$ in the optical axis direction, and the optical axis is adjusted by changing the crossing angle θ between the two concave mirrors $13_R$ and $13_L$ by the angle adjustment means. Alternatively, as in the first embodiment, the optical axis is adjusted by integrally moving the display element 1, the lenticular lens 3, and the V-shaped concave mirrors 13 forward/backward with respect to the concave mirror 8 or by changing the interval between the two concave mirrors $8_R$ and $8_L$ if they are used.

In this embodiment, since the observer observes virtual images obtained by enlarging an image displayed on the display element via the concave mirror 8, the depth of the image can be increased, and the reality of the stereoscopic image can be improved.

In this embodiment, the distance between the concave mirror 8 and the eyeballs can be shortened by folding the optical paths using the compact concave mirrors $13_R$ and $13_L$, thus attaining a size reduction of the entire apparatus.

In this embodiment, the optical axes of the right and left eyes of the observer point the center of the virtual image 11, and the central optical axes of the right and left eyes form a convergence angle therebetween. Also, when the central optical axes are parallel to each other or diverge (form a divergence angle therebetween), the optical axis can be adjusted by the above-mentioned angle adjustment means.

The concave mirror 8 may be replaced by a plane mirror and separated light beams can be projected from the two compact concave mirrors onto the plane mirror.

Furthermore, when a convex lens is arranged on the display element of this embodiment, the compact concave mirrors may be replaced by two plane mirrors, and separated light beams can be projected onto the concave mirror 8.

The second embodiment constitutes a stereoscopic image display apparatus completely shielded from the exterior since the concave mirror 8 comprises a total reflection mirror. On the other hand, when the concave mirror 8 comprises a semitransparent mirror, virtual images of stereoscopic character images may be synthesized with the exterior transmitted through the semitransparent mirror. In this case, if the concave mirror comprises a liquid crystal transmission mirror, the reflection region can be arbitrarily set.

When a region on the concave mirror 8 that crosses the observation optical paths of the virtual images R' and L' uses a total reflection mirror and the remaining region uses a transparent mirror, a semitransparent mirror, or a liquid crystal element or an electrochromy filter that can arbitrarily set its transmittance or reflectance, external light 14 can pass through the region, so as to synthesize the stereoscopic image display screen with the exterior.

Figure 3:
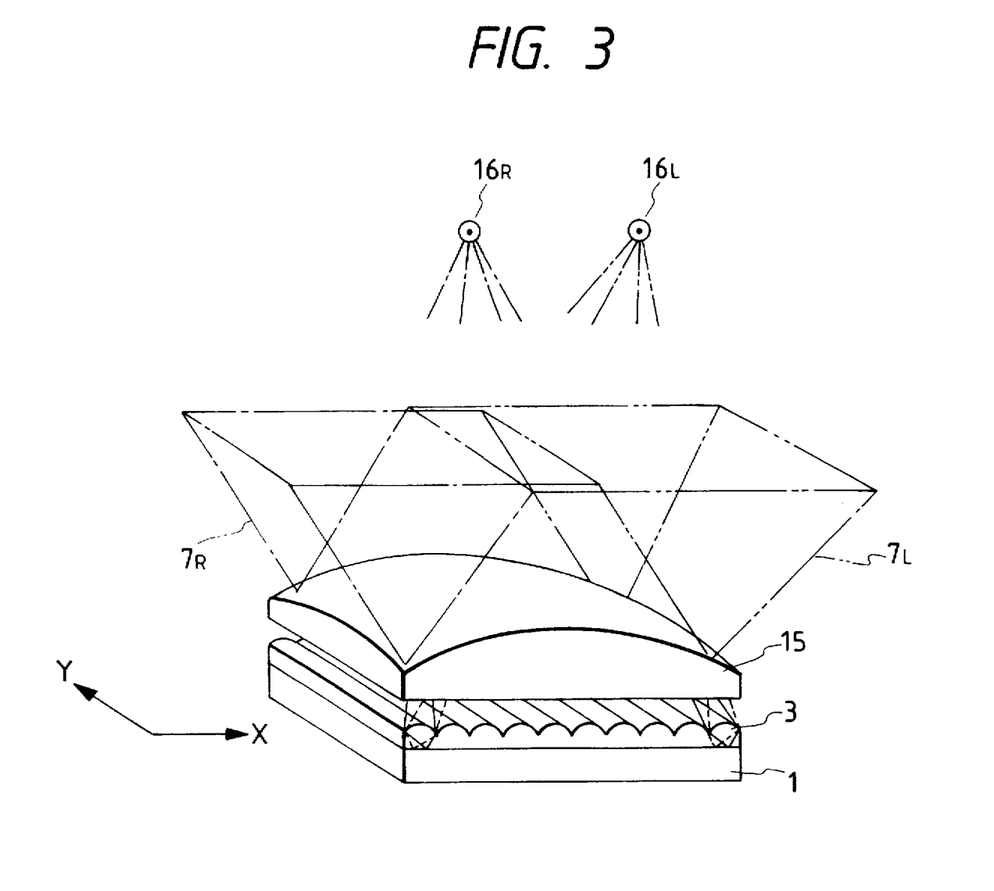
FIG. 3 is a perspective view showing another embodiment of an image separation optical system in a stereoscopic image display apparatus of the present invention.

FIG. 3 is a perspective view showing another embodiment of the image separation optical system in the stereoscopic image display apparatus of the present invention. The optical system shown in FIG. 3 includes a toric lens 15.

As described above, in the lenticular lens method, the separation angle of light beams from the right and left stripe pixels is determined by the pixel interval on the display surface and the curvature of the lenticular lens.

Although the separation angle can be widened up to a total of about 60° in the right-and-left directions depending on the pixel layout, when a compact, high-resolution display element is used, the pixel dimensions and intervals of stripe pixels $R_{i+1}$ and $L_i$ become small, and the curvature of the lenticular lens is also limited. Hence, it becomes difficult to separate light beams in correspondence with the pupil interval between the right and left eyes in direct observation.

In view of this problem, in this embodiment, the toric lens 15 is disposed at the light beam outgoing side of the lenticular lens 3 to increase the separation angle of right and left right beams $7_R$ and $7_L$. In FIG. 3, $16_R$ and $16_L$ represent the observation positions when no toric lens is used.

As is well known, a toric lens can adjust the image enlargement factors in two, i.e., X- and Y-directions. In the case of this embodiment, not only the separation angle of the light beams from the right and left stripe images $R_i$ and $L_i$ can be adjusted, but also the image to be displayed can be enlarged in the direction of generator of the lenticular lens 3.

With the above arrangement, an image displayed on the compact display element 1 can be enlarged and an image with a wide field angle can be projected onto the concave mirror 8.

The image separation optical system of this embodiment can be applied to the first and second embodiments.

In the first and second embodiments, since only one display element is used, a low-cost HMD can be constituted. Also, the consumption power of the entire display apparatus can be low, and when the present invention is applied to a portable HMD, the service life of a battery can be prolonged. In both the embodiments, since only one display element is used, the entire optical system has a simple structure, and hence, the weight of the HMD can be reduced, thus assuring high portability and reducing the load on the head portion of the observer.

In the two embodiments, since light beams of the two parallax images are independently guided to the right and left eyes, a high-resolution stereoscopic view with a wide field angle can be realized although the apparatus has a single-panel arrangement.

In the two embodiments, when the display element is mounted on the head portion, the relative positional relationship between the observer and the display surface can be fixed, and the observation view range that follows the movement of the head portion of the observer can be presented, thus allowing observation of a correct stereoscopic image while preventing mixing of right and left parallax images, which readily occurs in the conventional display surface method.

The present invention may be combined with other conventionally proposed techniques. For example, an electroluminescence (EL) panel, an LED panel, or the like may be used as the display element in addition to an AM-LCD panel, a compact CRT, and the like. On the other hand, as an illumination light source for the display, external light may be used.

As the image separation optical system, a parallax barrier used in another display surface method can be used, as a matter of course, and the image separation method is not limited to a specific method.

When the optical system of the present invention is used for the purpose other than stereoscopic viewing, a two-dimensional image can be displayed on a large screen.

What is claimed is:

1. A head-mounted stereoscopic image display apparatus to be mounted on a head portion of an observer, comprising:
   display means for displaying a stripe image formed by dividing right and left parallax images that constitute a stereoscopic image into stripe pixels, and alternately arranging the right and left stripe pixels in a predetermined order;
   an image separation optical system disposed in front of said display means and adapted to separate light beams outgoing from the right and left stripe pixels; and
   a concave mirror adapted to reflect the light beams from said image separation optical system so as to allow the observer to observe virtual images of the parallax images,
   wherein said image separation optical system comprises a lenticular lens or a parallax barrier corresponding to the right and left stripe pixels, and further wherein said image separation optical system comprises a toric lens on the light beam outgoing side.

2. An apparatus according to claim 1, wherein said image separation optical system is disposed outside observation optical paths of the virtual images.

3. An apparatus according to claim 1, wherein said concave mirror comprises a total reflection mirror.

4. An apparatus according to claim 1, wherein said concave mirror comprises a semitransparent mirror.

5. An apparatus according to claim 1, wherein a region, crossing observation optical paths of the virtual images, of said concave mirror comprises a total reflection mirror, and the remaining region comprises a semitransparent mirror or a transparent mirror.

6. A head-mounted stereoscopic image display apparatus to be mounted on a head portion of an observer, comprising:
   display means for displaying a stripe image formed by dividing right and left parallax images that constitute a stereoscopic image into stripe pixels, and alternately arranging the right and left stripe pixels in a predetermined order;
   an image separation optical system disposed in front of said display means and adapted to separate light beams outgoing from the right and left stripe pixels;
   a concave mirror adapted to reflect the light beams from said image separation optical system so as to allow the observer to observe virtual images of the parallax images; and
   two mirrors adapted to reflect the light beams from said image separation optical system to guide the light beams toward said concave mirror and disposed in a V shape, and angle adjustment means for adjusting directions of the two light beams to be reflected by said two mirrors.

7. An apparatus according to claim 6, wherein said two mirrors comprise plane mirrors or concave mirrors.

8. A head-mounted stereoscopic image display apparatus to be mounted on a head portion of an observer, comprising:
   display means for displaying a stripe image formed by dividing right and left parallax images that constitute a stereoscopic image into stripe pixels, and alternately arranging the right and left stripe pixels in a predetermined order;
   an image separation optical system disposed in front of said display means and adapted to separate light beams outgoing from the right and left stripe pixels; and a first reflection member adapted to reflect the light beams from said image separation optical system so as to allow the observer to observe virtual images of the parallax images, wherein said image separation optical system comprises a lenticular lens or a parallax barrier corresponding to the right and left stripe pixels, and further wherein said image separation optical system comprises a toric lens on the light beam outgoing side.

9. A head-mounted stereoscopic image display apparatus to be mounted on a head portion of an observer, comprising:

display means for displaying a stripe image formed by dividing right and left parallax images that constitute a stereoscopic image into stripe pixels, and alternately arranging the right and left stripe pixels in a predetermined order;

an image separation optical system disposed in front of said display means and adapted to separate light beams outgoing from the right and left stripe pixels;

a first reflection member adapted to reflect the light beams from said image separation optical system so as to allow the observer to observe virtual images of the parallax images;

a second resection member having two mirrors adapted to reflect the light beams from said image separation optical system to guide the light beams toward said first reflection member and disposed in a V shape; and angle adjustment means for adjusting directions of the two light beams to be reflected by said two mirrors of said second reflection member.

10. An apparatus according to claim 9, wherein said first reflection member comprises a plane mirror, and said second reflection member comprises a concave mirror.

11. An apparatus according to claim 9, wherein said first reflection member comprises a concave mirror, and said second reflection member comprises a plane mirror or a concave mirror.

12. A head-mounted stereoscopic image display apparatus to be mounted on a head portion of an observer, comprising:

display means for displaying stripe images formed as a single image by respectively dividing right and left parallax images that constitute a stereoscopic image into stripe images and alternatively arranging the right and left stripe images in a predetermined order;

a lenticular lens or a parallax barrier provided over a surface of said display means for dividing light beams from said single image by each of light beams outgoing from left and right stripe pixels; and a concave mirror for reflecting each of said light beams divided by said lenticular lens or said parallax barrier and directing said each of them to each of left and right eyes, wherein virtual images of said parallax images are made to be observed by way of said concave mirror by said observer.

* * * * *

UNITED STATES PATENT AND TRADEMARK OFFICE
CERTIFICATE OF CORRECTION

PATENT NO. : 5,754,344
DATED : May 19, 1998
INVENTOR(S) : Yasutomo Fujiyama

It is certified that error appears in the above-identified patent and that said Letters Patent is hereby corrected as shown below:

Col. 11, line 24, change "resection" to --reflection--.

Signed and Sealed this

Twenty-second Day of September, 1998

Attest:

BRUCE LEHMAN

Attesting Officer

Commissioner of Patents and Trademarks